Oct. 10, 1933.     R. D. SMITH     1,929,455
FLOW CONTROL MECHANISM
Filed Nov. 23, 1926     4 Sheets-Sheet 2

Inventor,
Raymond D. Smith

Oct. 10, 1933. R. D. SMITH 1,929,455
FLOW CONTROL MECHANISM
Filed Nov. 23, 1926 4 Sheets-Sheet 3

Inventor,
Raymond D. Smith

Patented Oct. 10, 1933

1,929,455

UNITED STATES PATENT OFFICE 1,929,455

FLOW CONTROL MECHANISM

Raymond D. Smith, Fairfield, Conn., assignor to Tremont Products Corporation, Boston, Mass., a corporation of Massachusetts Application November 23, 1926
Serial No. 150,278

21 Claims. (Cl. 161—1)

This invention relates to apparatus for the automatic control of the flow of gas, electricity or other useful medium, and particularly to the control of same by timing mechanism, with or without other associated controls such as thermostatic regulators and safety devices. Claims to combination with and details of such other controls and particularly as relating to the heating function of domestic and industrial appliances in the cooking of food, heating of water, etc., are contained in my co-pending application, Serial Number 671,619, filed May 18, 1933, and which is in part a continuation of the present application.

Possible embodiments of the invention and illustrative modifications indicating more fully its scope are shown in the accompanying drawings in which.

Throughout the drawings different views of the same part are designated by the same reference numeral.

The frame parts for the timer mechanism comprise a front frame plate 10 and clock plate 11 connected and spaced by four posts 12 riveted to the front plate and having threaded rear ends engaged by nuts 13 to retain the clock plate in the usual way against the shoulders of the posts. Supported between the front plate 10 and clock plate 11 is a system of rotary mechanism shown sectioned in Fig. 22 in edgewise elevation in Fig. 2 and in perspective in Fig. 31 and which includes the time determining means and has operated and operating connection with the time movement inside casing 59 by means of pinion 25 having its front hub elongated and recessed at the forward end for bearing on the stud 14 and having its rear hub elongated to be journaled in clock plate 11 and provided with a square hole engaging the squared terminus of winding spindle 19 of the time movement so as to turn therewith.

Figures 22, 23, 25, 28:
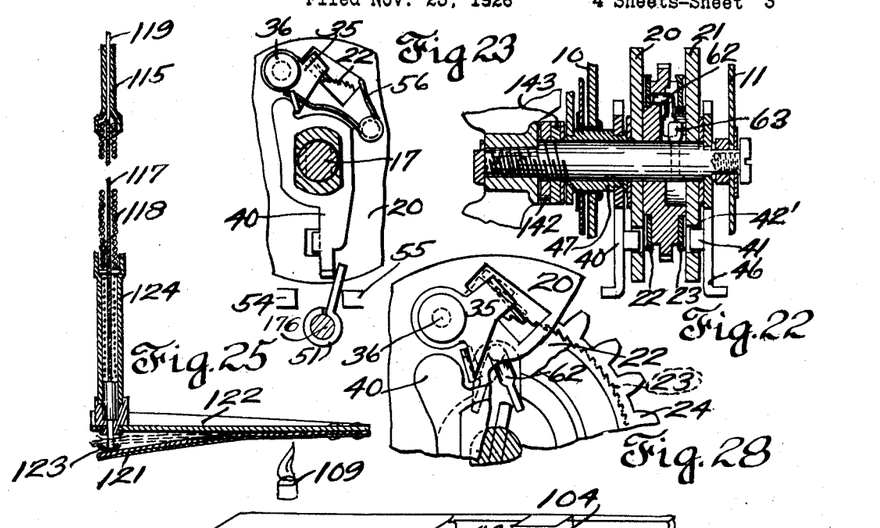
Fig. 22 is a sectional view of the various parts centered upon the main time setting spindle and is taken upon the plane 22—22 looking from the right in Fig. 1.
Fig. 23 shows details of the releasable pawl-and-ratchet driving and stop mechanism for the front timer cam looking toward the right from plane 23—23 in Fig. 2.
Fig. 25 shows possible details of construction of the flexible connector 116 shown in Fig. 2 for transmitting the heat effect of a remote pilot flame 109 to the locking device that prevents the valve from being opened unless the pilot light is burning.
Fig. 28 shows in enlarged fragmentary detail, a view of the flip stop drive engagement between the main gear and the main shaft of the timing mechanism.
Figures 31, 32, 33, 34:
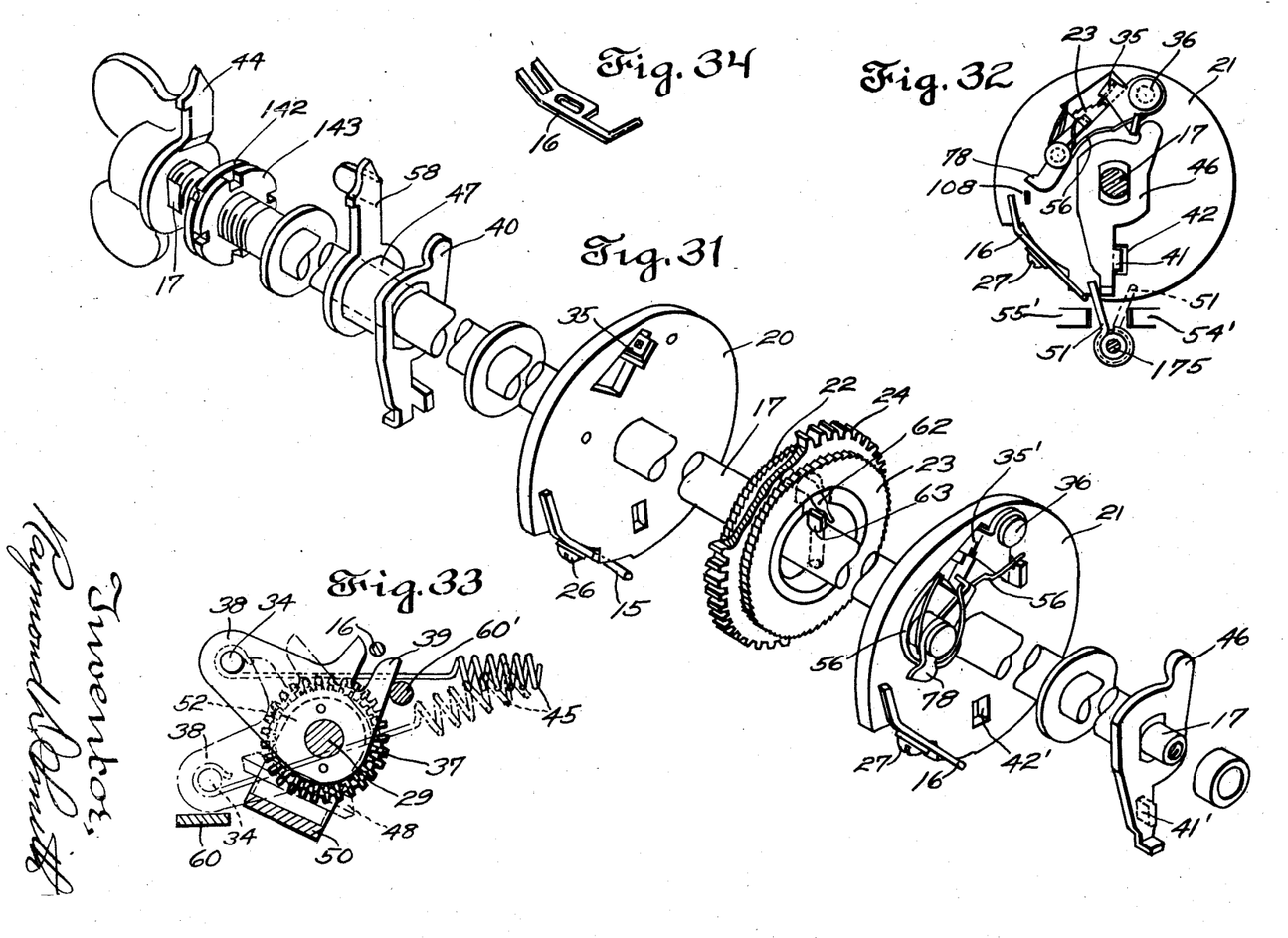
Fig. 31 is an isometric view of the group of parts of Fig. 22 showing same in separated relation for clearness of illustration.
Fig. 32 shows details of the rear timer cam mechanism corresponding to that of the front timer cam mechanism of Fig. 23 and is taken on the plane 32—32 in Fig. 2 looking toward the left.
Fig. 33 is a section on the plane 33—33 in Fig. 4 looking toward the right and is drawn on an enlarged scale corresponding to said Fig. 4.
Fig. 34 shows a detail view in perspective of one of the cam fingers.

The time setting mechanism shown more particularly in Figs. 22 and 31 is comprised of two concentric and mainly similar sets of parts mounted to turn upon the shaft 17. Each of these sets of parts derives its time giving movement from variable and releasable drive connection to a central gear 24 constantly in mesh with pinion 25 and flanked by two ratchet toothed wheels 22 and 23 mounted on said gear to turn fixedly therewith.

One the the two sets of parts turning upon the shaft 17 comprises in fixed relation to said shaft 17 the handle pointer 44 at the forward end thereof and the release dog 46 at the rear end. Impelled manually by release dog 46 is the timer disc 21 thru engagement of forwardly bent tongue 41' with an opening 42' in timer disc 21 permitting a very small degree of lost motion and limited relative movement between release dog 46 and timer disc 21. Timer disc 21 is further provided with a pawl 35' pivoted at 36 to fall into engagement with the ratchet teeth on wheel 23 being yieldingly urged to such engagement by the spring 56 and displaceable from such engagement by the limited relative movement above described between timer disc 21 and release dog 46. This permits timer disc 21 to be freely rotated in either direction by means of handle pointer 44 and when undisturbed to be positively driven by ratchet wheel 23 until something occurs to impede the free travel of release dog 46 or handle 44 which turns fixedly therewith, at which time in a manner that will be obvious from Fig. 32 the resistance to the travel of release dog 46 when it meets stop lever 51 and the continued impelling of timer disc 21 (in a clockwise direction in Fig. 32) by ratchet wheel 23 through the medium of pawl 35' will cause release dog 46 to turn upon its pivot 36 and lift pawl 35' out of engagement with ratchet wheel 23 permitting the ratchet teeth to pass successively into and out of engagement with pawl 35' accompanied by short oscillatory movements of timer disc 21 as each tooth slowly passes under the pawl 35'. A swinging stop 51 pivoted on a stud 175 backed up by abutments 54' and 55' on the clock plate 11 offers such impedance as will arrest counter clockwise movement of handle pointer 44 when it reaches top center or zero position and permit, in the manner described, the continued traveling in the same direction of ratchet wheel 23 each tooth thereon freeing itself from pawl 35' as it passes, due to the relative oscillatory movements between timer disc 21 and the release dog 46.

Figures 5, 6:
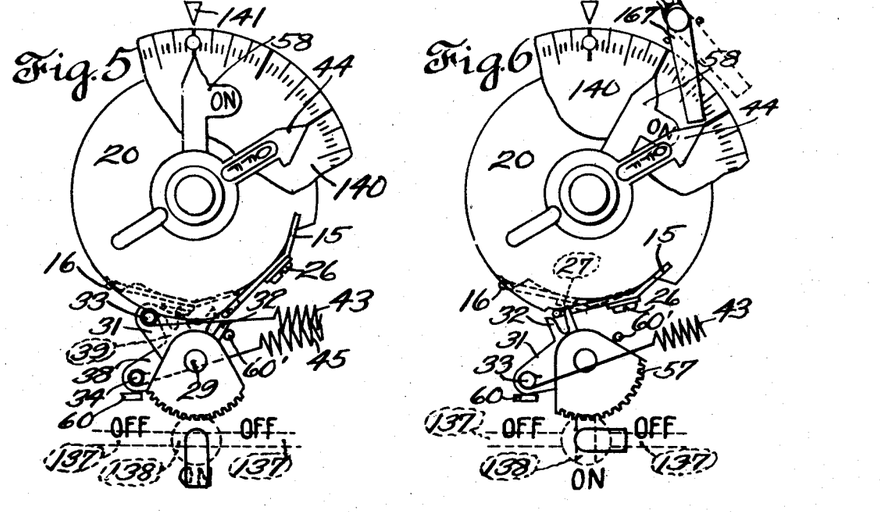
Fig. 5 is a diagrammatic front view showing the parts of Fig. 1 in the positions they will occupy when only one of the time-setting pointers is displaced from zero.
Fig. 6 is a view showing positions the parts of Fig. 5 may assume when both time-setting pointers are displaced from zero.

A similar action and relation of parts is comprised in the fixedly assembled time setting pointer 58, bearing hub 47, and release dog 40, stopped by the swinging stop 51' pivoted on stud 176 (see Fig. 23), which parts as a rotary unit coact with the timer disc 20 and its pawl 35 in the same manner as above described with reference to release dog 46 timer disc 21 and pawl 35', the ratchet wheel 22 in this case acting upon pawl 35 at ratchet wheel 23 is above described as acting on pawl 35'. Interlocking nuts 142 and 143 provide adjustable thrust play for the relatively movable parts on shaft 17. The graduated time-determining dial 140 may have any markings consistant with its purpose and may be fixed for indicating periods of time, or rotatable for computing and setting the time of action so that same shall occur at any desired time of day. A zero marker such as 141 is positioned where desired and commonly at the point reached by pointers 44 and 58 when the automatic spring-caused throw of arms 31 and 38 takes place as hereinafter to be described. A stop 167 is shown in Fig. 6 to prevent return of pointer 44 to zero position if desired.

With reference to this much of the timing mechanism there remains to be described only the driving connection between shart 17 and gear 24 comprised in the engagement between a pin 63 freely rotatable in recess in gear 24 and engaging with the crank-like flip stop 62 pivoted in the wall of said gear to allow a full circle of relative movement, and even more, between shaft 17 and gear 24. It may also be mentioned that the time-giving movement for driving pinion 25 may be of any construction, the usual type embodying a spring 65 or other source of movement for delivering power to the spindle 19 which may or may not be subject to the retarding action of a train of gears with time giving escapement, some sensitive member of which if employed, such as wheel 74, may be acted upon by an agitating member 108 that may be actuated in any desired way to insure starting of the movment such as by a finger member 78 carried by timer disc 21, which causes member 108 to agitate wheel 74 at the initial movement of the disc 21 in a clockwise direction away from its zero position in Fig. 1. Member 78 may pass member 108 without actuating the latter in the opposite direction of travel.

In some of the former applications of this timer mechanism timer discs such as 20 and 21 have been provided with notches or irregularities in their peripheries to exclude and admit certain escapement controlling mechanism as a means of effecting predetermined time control of electric switches, gas valves, etc.

In the present instance timer cams 20 and 21 may carry, respectively, actuator fingers 15 and 16 (see Fig. 34) which are retained against the periphery of the cam to be circumferentially adjustable thereon by means of screws 26 and 27. These fingers may be used to actuate under time control, or manually at will, a great variety of actuating mechanisms for devices to be timed, but such are subject to comparatively simple classification in the main characteristics of their nature and sequence of their operation.

The timer actuated mechanism herein disclosed and claimed is broadly illustrative of mechanical principles and resulting functions which may have a great variety of embodiments. The embodiment here chosen for purposes of illustration comprises a support bar 18 spanning and secured to the two lower posts 12 by means of screws 28 (see Fig. 35) and at its central portion fixedly holding a pivot pin 29 on which is pivoted on opposite sides of the bar 18, two rotors, one comprised of the bevelled gear 30 fixed to the spring arm 31 having fork 32 at the front of bar 18 and the other comprised of a similar bevelled gear 37 fixed to the spring arm 38 having fork 39 at the rear of bar 18. Spring arms 31 and 38 carry respectively spring studs 33 and 34 between which and the post 12 extends respectively the two springs 43 and 45 normally urging both of these arms and their associated parts into the position against stop 60' shown in full lines in Figs. 3, 33 and 35, and in broken lines in Fig. 1. In its automatic action to operate the flow control at the end of the time run the power of springs 43 and 45 may be such as to force cams 20 and 21 ahead of ratchet wheels 22 and 23, by action of forks 32 and 39 on fingers 15 and 16 and return pointers 44 and 58 to their starting point with greater speed of action than they would be so returned merely if impelled by fingers 15 and 16 in the running of the time movement. In this action the pawls 35 and 35' slip freely over the ratchet wheels 22 and 23 in their natural direction of slippage.

Working on the differential principle and constantly in mesh both with bevelled gear 30 and 37 is a bevelled gear 48 pivoted on stud 49 carried by a U-shaped member 50, concentrically pivoted with and straddling gears 30 and 37 on the stud 29 by means of the rear arm 52 and front arm 53 fixedly joined to form a single structure. The front arm 53 is formed as a gear segment having the teeth 57 this segment occupying some one of three definite positions shown respectively in Figs. 35, 5 and 6 corresponding to positioning of the parts of the timing mechanism shown in said figures through the actuation of forks 32 and 39 by fingers 15 and 16 respectively.

The movement of segment 53 between its three different positions referred to above may be utilized to effect a great variety of selective functions particularly useful although by no means confined to the operation of valves and electric switches. It will be seen that when one or both of spring arms 31 and 38 are thrown to the position in Fig. 6, and shown by broken lines in Figs. 3 and 33 by displacement of pointers 44 and 58 from zero position, studs 33 and 34 occupy a position wherein the pull of springs 43 and 45 falls to the opposite or lower side of the pivotal center 29 from the condition shown in Fig. 35 and forces the spring arms against the stop 60 where they will remain until dislodged by the return of fingers 15 and 16 by hand operation or by the running of the timing mechanism at which time after dislodgement from the near dead-center condition of tens on the power in springs 43 and 45 will complete the travel of forks 32 and 38 back to the original or starting position first described,—and preferably with a snap action depending upon the strength of the springs 43 and 45, so it is to be noted that it depends upon the power in springs 43 and 45, stored there by the manual act of displacing pointers 44 and 58 from zero position, as to whether this power shall in itself merely help to actuate the segment 53 while the latter is being impelled by running of the time mechanism, or independently thereof and with a snap action as if "fired" by the timing mechanism.

In the main illustration shown in Figs. 1, 2, 5 and 6 and 35 the movement of segment 53 is utilized to rotate the usual tapered plug 69 controlling the ports of a gas cock by means of a pinion 64 fast to the stem of the gas cock and in mesh with segment 53, the stem being extended forwardly through a bearing hole in the front plate 10 and turned at right angles at 99 to serve as a condition indicator and emergency hand control for the gas cock. The body 139 of the gas cock may be fastened to and in back of the clock plate 11 and provided with internally threaded ends 135 and 136 for connection to the pipe of the gas line, the connecting passage 137 being opened or closed by respective alignment or disalignment of the port 138 in valve plug 69.

That part of the structure above described constitutes a complete time operated control for the flow of gas or other medium distinguished by the following features: First, by the simple act of displacing pointer 44 from its zero position shown in Fig. 1 the time movement is wound and set in operation and the gas valve is opened; Second, by the simple additional act of displacing time pointer 58 from its zero position shown in Fig. 1 the gas valve is closed again; Third, after both pointers 44 and 58 are displaced from zero the running of the time movement carries them at equal speed back to their starting position resulting automatically in the reversal of the gas valve movements that were effected by their displacement, that is to say at arrival of time pointer 58 at a designed position near its starting point, finger 15 will dislodge spring arm 31 from its dead center locked position causing it to be helped or fired by the power in spring 43 to open the valve. Likewise on the return of pointer 44, finger 16 will dislodge and set in action spring arm 38 under the impulse of spring 45 to automatically close the valve. The rotative travel of segment 53 may conveniently be half that of either gear 30 or gear 37 as will be the case if all three bevel gears are of equal pitch diameter.

Figures 7, 8, 9, 10, 11, 12, 17:
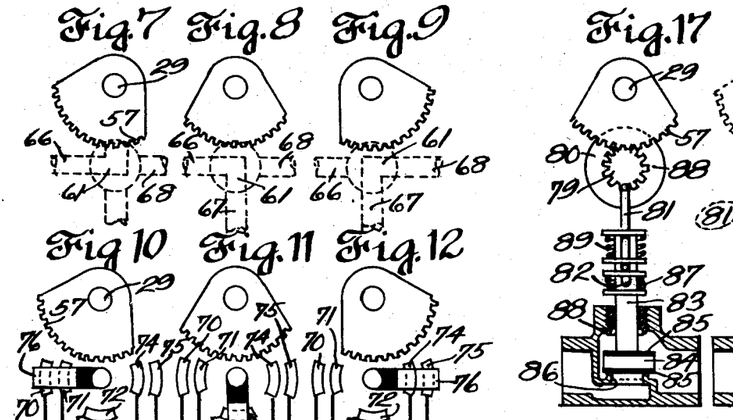
Figs. 7, 8 and 9 show, respectively, three different conditionings of a tri-port valve which may be effected by the respective actions of the timing mechanism indicated by Figs. 1, 5 and 6.
Figs. 10, 11 and 12 show respectively three different conditionings of electrical switch contacts which may be effected by the respective actions of the timing mechanism indicated by Figs. 1, 5 and 6.
Fig. 17 shows the 3-position, toothed segment of the preceding figures geared up so that its total angular movement shall result in greater proportional angular movement of a wheel which may be connected to transmit reciprocative movement to a valve shown closed, or to any other piece of mechanism as desired.

For indicating the variety of effects that may be had in the control of gas or electric lines by the characteristics of mechanism above described, Figs. 7, 8 and 9 show the tapered plug 69 provided with an angle port 61 disposed to line up in three different combinations with three stationary ports in the valve body. For instance in Fig. 7 all flow is cut off to and from each of ports 66, 67 and 68. In Fig. 8 (corresponding with Fig. 5 to which the parts are moved from Fig. 7 corresponding with Fig. 1) port 66 is shown connected with port 67. Fig. 9 shows the position corresponding with Fig. 6 wherein the ports 67 and 68 are connected.

Figs. 10, 11 and 12 are indicative of a great variety of arrangements of movable and stationary electric switch contacts by means of which the movement of segment 53 may be utilized to connect and disconnect various electric circuits in predetermined combination at predetermined times. In Fig. 10, six stationary contacts numbered from 70 to 75 inclusive may be connected, for instance, in pairs by means of the swinging contact bridging arm 76. The manner in which this arm connects the different contacts will be plain from reference to Fig. 10 corresponding to timer parts as positioned in Fig. 1, Fig. 11 corresponding to Fig. 5, and Fig. 12 corresponding to Fig. 6.

Assuming for instance that we let "L" represent a line circuit "C'" represent a load circuit, "C²" represent another load circuit and "C³" represent a still different load circuit and let wires be designated by "O" that are not connected in circuit at all, then we would have the following results:

Fig. 10, (with line and load connections as they are shown) "On". Fig. 11, "Off". Fig. 12, "On".

Figure 13:
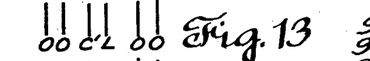
Figs. 13, 14, 15 and 16 show diagrammatically various ways in which the electrical switch contacts of Figs. 10, 11 and 12 may be connected in circuit to accomplish different combinations and progressions of electrical effects.

With the contacts connected as per Fig. 13, Fig. 10 will give "Off", Fig. 11 "On" and Fig. 12 "Off".

Figure 14:
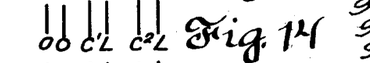

With connections as in Fig. 14, Fig. 10 will give "Off", Fig. 11 will connect one load to the line and Fig. 12 will disconnect the first load and connect a different load to the line.

Figure 15:
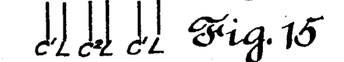

With contacts wired as per Fig. 15, Fig. 10 will connect one load to a line, Fig. 11 will disconnect the first load and connect a different load to the line, and Fig. 12 will disconnect the latter load and reconnect the first load again.

Figure 16:
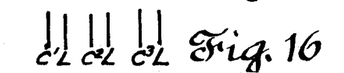

With contacts wired as per Fig. 16, Fig. 10 connects one load to a line, Fig. 11 disconnects that load and connects a different load to the line and Fig. 12 disconnects the latter load and connects a new and third load to the line.

It is obvious that by adding to the number of contacts and varying their relation an indefinite number of further variations in circuit control is possible to the time determined movements of segment 53 which, it will be understood, is manually establishable in any of its different positions by means of time pointers 44 and 58 at any time.

Figures 1, 2, 3, 4, 30, 35:
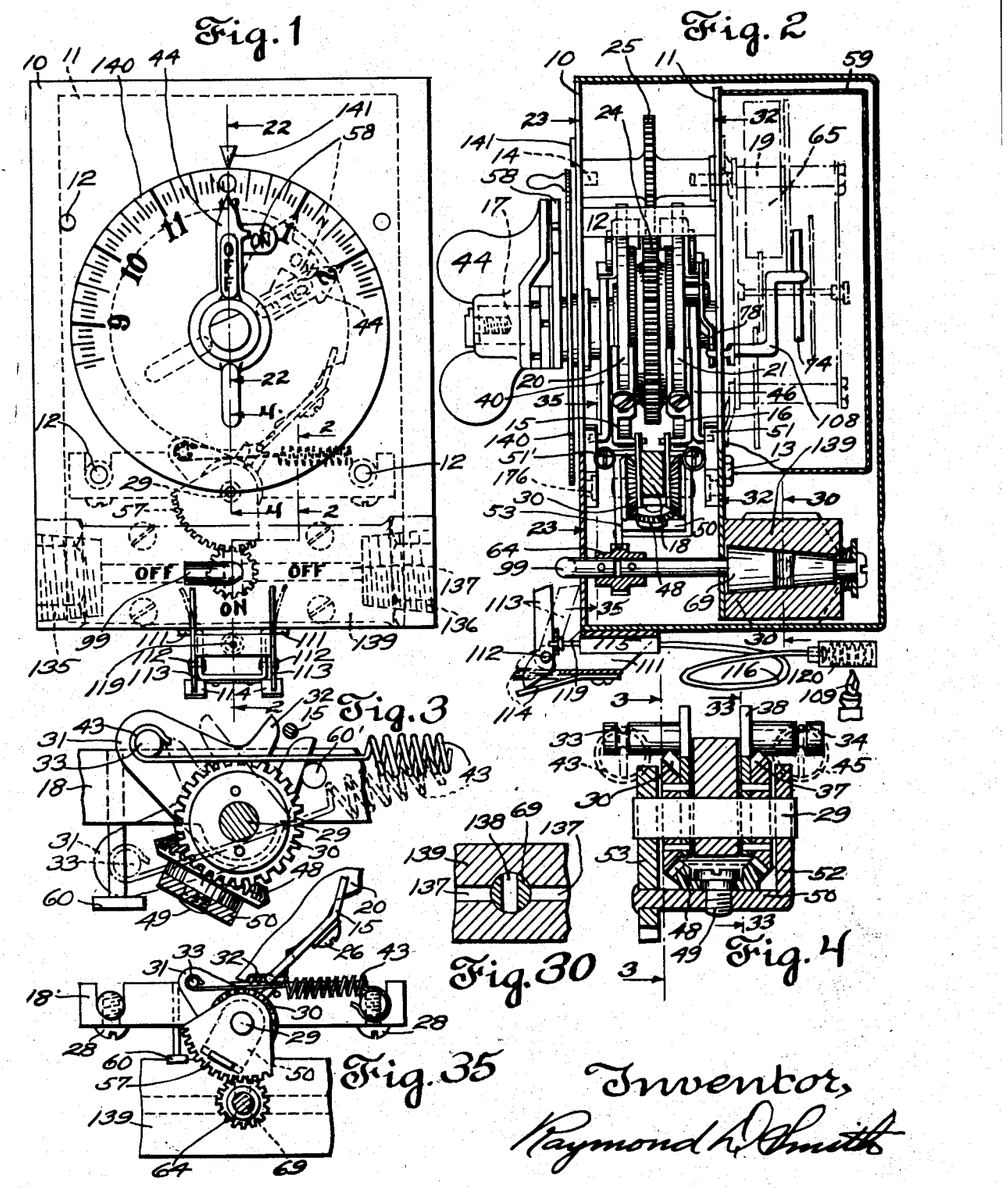
Fig. 1 is a front view of one form of flow control and timing mechanism that I may employ in practicing the present improvements.
Fig. 2 is a view looking at Fig. 1 from the right, the outer casing being broken away and certain of the parts shown in section on the vertical planes 2—2 in Fig. 1.
Fig. 3 is an enlarged fragmentary view taken on the plane 3—3 in Fig. 4 looking in the direction of the arrows.
Fig. 4 is a correspondingly enlarged view taken in section on the plane 4—4 in Fig. 1 looking in the direction of the arrows.
Fig. 30 shows a section through the valve port on the vertical plane 30—30 in Fig. 2.
Fig. 35 is a partial front view of certain parts of the actuating mechanism looking toward the right from plane 35—35 in Fig. 2.
Figure 18:
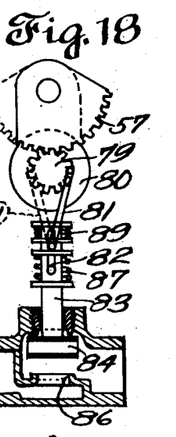
Fig. 18 shows positions to which the parts move to open the valve of Fig. 17.

Fig. 17 shows the segment 53 in mesh with a pinion 79 similar to pinion 64 in Fig. 2 but turning a disc 80 operating a connecting rod 81 slidable in a slot 82 in a plunger valve stem 83 which carries the piston 84 surfaced on its top and bottom with a washer 85 of soft material adapted to be pressed against the lower seat 86 by spring 87 when the valve is closed and to be pulled against the upper seat 88 by the spring 89 when the valve is open, this latter seat effectively sealing escape of gas around the bearing in which the valve stem 83 slides. Fig. 17 corresponds to the position of parts in Fig. 5 and in Fig. 18 the full lines indicate the position corresponding to Fig. 6 and the dotted lines corresponding to Fig. 1. It will be observed that the movement of the three-position segment 53 is transformed into reciprocative movement of a two position valve.

Figures 19, 20, 21:
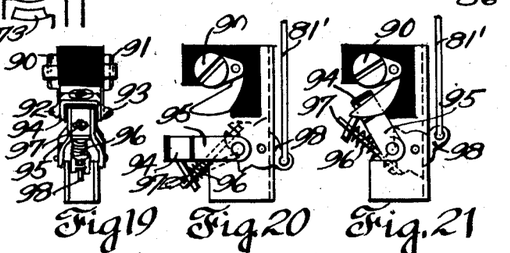
Figs. 19 and 20 show respectively an edge view and a side view of a spring actuated electric snap switch, Fig. 20 showing the switch in position to break the circuit as would be caused by a position of parts corresponding to Fig. 17 were such snap switch to be substituted for the valve in the latter figure.
Fig. 21 shows the switch of Fig. 20 snapped to circuit closing position by a movement of the actuating parts indicated in Fig. 18.

We therefore have at hand all necessary mechanism for operating a simple reciprocative or toggle action electric snap switch by the power in springs 43 and 45 and therefore not requiring the work to be done by the time movement that would have to be done to operate a snap switch such as is shown in Figs. 19 and 20 thru sole actuation by either of the fingers 15 or 16 carried by the time discs 20 and 21. In Figs. 19 and 20 binding posts 90 and 91 retain flexible metal contacts 92 and 93 which are conductively connected by the insulated terminal 94 carried at the end of a swinging arm 95 operated with a snap action in both directions by the toggle compression spring 96 surrounding the slidable guide rod 97 which is swung back and forth by movements of the rocker arm 98, slow movements of this rocker arm thereby producing snap action of member 94 between its two positions in Figs. 20 and 21. This may be occasioned by the connecting rod 81' operated as in Figs. 17 and 18.

When the medium whose flow is to be controlled is gas, the escape of which without burning would be dangerous for any reason, it is highly desirable in connection with any automatic device to turn on the gas that means be provided to prevent the gas from being turned on unless a pilot flame is present to insure its being lighted. An example of this need will be appreciated from the application of a timing mechanism as hereinbefore described to control the time at which cooking operations shall be started and stopped on a domestic gas range.

Figures 24, 26, 27, 29:
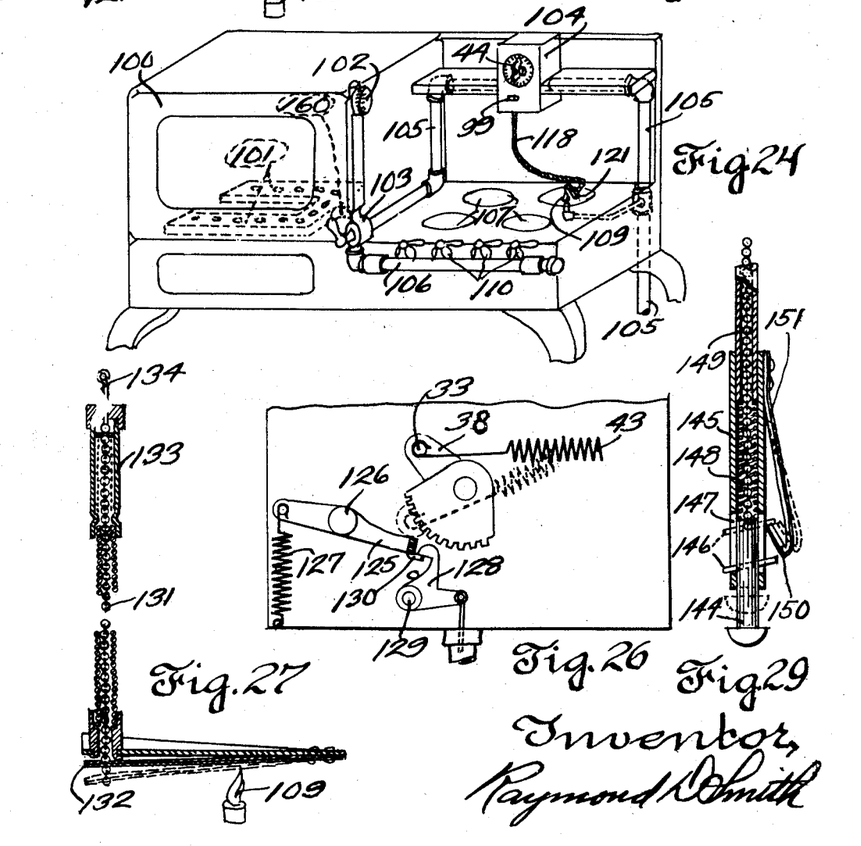
Fig. 24 shows a practical application of the timing mechanism pictured in the preceding figures wherein same is incorporated within a system of piping in an ordinary domestic cooking range; the system incorporating for purposes of better explaining the uses of this invention and in addition to the timing mechanism control, other automatic means to govern the flow of gas to the burners such as a thermostatic valve regulator to govern the heat of the oven and a thermostatic safety pilot light to prevent the possible escape of unignited gas.
Fig. 26 shows a safety mechanism that will function as a part of my improved timing mechanism in such manner that the valve will automatically be closed at any time the pilot flame may become extinguished while the valve is open.
Fig. 27 shows details of construction of a flexible cable suitable for transmitting the heat effect of a remote pilot flame to the valve closing mechanism of Fig. 26, it differing from the flexible cable in Fig. 25 because of operating through a pull action instead of a push action.
Fig. 29 shows a further variation of the construction and function of a pilot flame thermostatic cable control.

In this and other uses it may be desirable to prevent timer 104 from opening the supply line 105 in case the pilot flame 109 (see Fig. 2) be not burning for igniting the gas. Fig. 24 illustrates the conventional parts of an ordinary gas stove as an example of one useful purpose of the safety locking mechanism pictured in Figs. 1 and 2 as a part of the present improvement.

Many mechanisms may be employed to accomplish this. In Figs. 1 and 2, I show a bracket 111 affording pivots 112 for a two-part rocking lever 113 normally urged by a two-part leaf spring 114 into dotted line position in Fig. 2 in which position lever 113 will prevent removal of valve stem 99 from either of its "off" positions but is flexible for yielding to its dotted line positions in Fig. 1 to permit movement of 99 into its "off" position in either direction. A plunger guide 115 serves as one terminal of a preferably flexible cable 116 containing a means for transmitting a force and mechanical movement from one of its ends to the other. Such a cable may have many constructions and of course need be bendable only for convenience and neatness of installation. In the present embodiment as shown in Fig. 25 the main length of this cable is comprised of an internal close coiled fine wire core 117 and an external close wound tubular conduit or housing 118 formed of coarser wire to be relatively rigid and wound large enough in inside diameter to permit the free sliding therethru of the core coil 117. At its working end connector or cable 116 has the terminal guide 115 fixedly secured to the armor 118 and a rod 119 connected to and terminating the sliding core 117 so that a push outwardly on rod 119 against lever 113 depresses spring 114 and maintains lever 113 in its full line position in Fig. 2 permitting operation of the valve. Conduit 118 may be solid metallic tubing or pipe and absolutely rigid if desired.

Any kind of suitable thermostatic device may form the remote terminus of cable 116 designated to be held in a position to be heated by the burning of pilot flame 109 thereby to exert the necessary push upon the core 117 to hold lever 113 in its releasing position shown in full lines so long as the pilot flame is burning. In Fig. 2 the form of thermostat 120 indicated is that of a cylinder containing a nest of expansible disc thermostats. The thermostat can as well be a bi-metallic strip or a non-metallic rod acting in an expansible metallic tube or any other form of thermo dynamic device many of which are well known in the art.

For more stringent requirements of safety against accidental escape of unignited gas it may be required that the accidental extinguishment of pilot flame 109 not only prevent the gas from being turned "on" but in such event shall cause a mechanical action to turn the gas "off" from no cause other than the mere extinguishment of the pilot light. Fig. 26 shows simple mechanism that will accomplish this in the case of the time control valve of the present invention in the form of a lever 125 pivoted at 126 having a strong spring 127 tending to rotate same counter clockwise so that the opposite end of lever 125 will act upwardly under the power of spring 127 to dislodge both of spring arms 31 and 38 from their dead center locked position shown in Fig. 6. I may then provide a catch such as 128 pivoted at 129 to engage with a lip 130 at the extreme end of arm 125 to hold the latter depressed against the action of spring 127 so that to close the valve in any condition of the timing mechanism, it is only required to free lever 125 from catch 128. This I may do by any suitable mechanism that will act upon the extinguishment of pilot flame 109 and I have pictured in Fig. 27 for example a flexible cable much similar to that shown in Fig. 25 except that the motivating core 131 is a chain adapted to be pulled by cooling of thermostat 132 to its dotted line position and I can conveniently use for this purpose a so called ball-chain or bead-chain comprised of hollow sheet metal spheres or balls connected by dumbbell-shaped wire connectors, a light spring 133 urging the hook 134 outwardly from the cable but of such strength as to be overcomable by the action of the thermostat in cooling. Obviously when the pilot light 109 ceases to furnish heat to the thermostat 132, hook 134 is pulled downwardly retracting catch 128 to release lever 125 and permit spring 127 to close the valve should it happen to be open.

Among the many modifications possible within the scope of the invention the following may be worthy of mention.

I may retain arms 31 and 38 against the pull of springs 43 and 45 in many ways other than to merely cause them to pass the pull of the springs slightly to the opposite side of dead center. Various kinds of catches and detents may be employed that will be caused to release said arms when passed by fingers 15 and 16 in counter clockwise travel. A broad and novel accomplishment is represented in the present disclosure and which is equally embodiable as a principle either in the over-dead-center method of "cocking" rockers 32 and 39 or in catches or detents employed as substitutes therefor as just suggested. This accomplishment is the "cocking" of rockers 32 and 39 by mechanism so arranged that the travel of fingers 15 and 16 back to zero position as impelled by the time movement shall encounter only a very small resistance, viz., that required merely to start rockers 32 or 39 away from dead-center position in Fig. 6, or in the case of catches or detents for holding rockers 32 or 39, merely the frictional resistance offered to "firing" or releasing said catch or detent. Springs 43 and 45, or any other forms of power spring for operating the flow control, may therefore be made as heavy as desired without offering a correspondingly heavy load or resistance for fingers 15 and 16 to overcome on passing forks 32 and 39 in returning to zero. If, for instance, an ordinary latch were employed as a means of holding rockers 32 and 39 in "cocked" position the left hand prong of fork 32 in Fig. 16 would, because of the necessary back-lash, rise again after being depressed and passed by clockwise rotation of finger 15, and slightly occupy the path of finger 15 and have to be depressed again by finger 15 when the latter is being carried back to zero position by running of the time movement, requiring to do this, as great a force to be exerted by finger 15 as was originally required to establish the rocker 32 in tensioned or "cocked" position. The springs 43 and 45 may be arranged to act as compression springs pushing upon arms 31 and 38 instead of pulling. Such springs may also be coiled spiral springs or helical springs exerting torque around their center of curvature if desired.

With reference to the safety pilot frame 109 and associated thermostat it is noted that other means of transmitting the heat effect of pilot flame 109 into mechanical action at some remote point may consist in a conduit containing a link chain adapted to be twisted to produce rotary movement by action of the thermostat, or if desired the conduit 116 may be constructed to be of fluid type and filled with a heat sensitive fluid such as anoline which itself will constitute the thermostat and by being warmed throughout by conduction and convection of heat radiated by pilot 109 will exert pressure and consequent mechanical action at the end of cable 118 remote from the pilot flame.

If more power and movement be required of the hook 134 in Fig. 27 I may provide a cable control sensitive to a pilot light as shown in Fig. 29. Here I employ a conduit 149 with solid walls of suitable material such as soft copper which is bendable without material collapse of the circular cross section of the lengthwise passage therethru. The hook 134 and chain 131 may be employed as before but I may terminate the chain by attachment to a plunger 144 slidable in the conduit terminal 145 and carrying the cross pin 146 slidable in slots 147 lengthwise of said terminal. A compression spring 148 between the end of conduit 149 and plunger 144 forces plunger 144 outwardly but yields to permit pin 146 to be depressed and caught under the hooked end 150 of thermostat 151 when the latter is warmed by heat of pilot flame. Upon cooling, thermostat 151 flexes outwardly releasing pin 146 and spring 148 forces plunger 144 outwardly pulling on chain 131 and hook 134 to lock or fire the valve and prevent escape of unignited gas.

I may employ any of the well known forms of magnet operated gas valves to be electrically controlled by switch contact action indicated in Figs. 10, 11, 12, 19, 20 and 21.

I may cause light duty contacts arranged in mutiple combinations as examplified in Figs. 10 to 16 inclusive, to perform as primary control for any form of heavy duty magnet operated contacts commonly known as a relay, some of which are closed by one magnet circuit and opened by another, and others of which are closed by making circuit through a magnet and opened by merely breaking that circuit.

Various other departures will be within a mechanic's skill and without intention of limiting this invention beyond its widest possible scope, what I claim is:—

1. In timing mechanism in combination, two actuators rotatable by timing mechanism, a device pivoted to be rocked by movement of each of said actuators, a connecting member between one of said actuators and said device acting to rock the latter in the same rotational direction as said actuator, and a separate connecting member between the other actuator and said device acting to rock the latter in the same rotational direction as the movement of the said other actuator.

2. In combination, two timing actuators manually settable to variable relative positions and self-returnable to a common starting position at equal rates of speed, a device to be timed, mechanism operable by each of said actuators and reversely affecting said device at each successive movement of each of said actuators to and away from its starting position, and means to increase the speed of actuation of said device by said mechanism disproportionately to the speed of movement of said actuators.

3. In combination, two timers manually settable to variable relative positions and self-returnable to a common starting position at equal rates of speed, a device to be timed, mechanism operable by each of said timers and reversely affecting said device at each successive movement of each of said timers to and away from its starting position, and indicator mechanism to show the true condition of said device corresponding to respectively different positions of said timers.

4. In combination, two time controlled actuators approachable to an operating position in the same direction of travel, two transmitters actuated in a common direction respectively by similar movements of said actuators, an ultimately governed device, and differential mechanism for converting the separate movements of said transmitters in a common direction to produce respectively progressive increments of movement of said device in a common direction.

5. In combination, two time controlled actuators approachable to an operating position in the same direction of travel, two primary transmitters actuated in a common direction respectively by similar movements of said actuators, a secondary transmitter, and differential mechanism for converting the separate movements of said primary transmitters in a common direction to produce respectively progressive increments of movement of said secondary transmitter in a common direction, together with a flow governor connected to be reciprocally moved by successive increments of movement of said secondary transmitter in a common direction.

6. Timing mechanism embodying, in combination, a reciprocal actuator, an associated reciprocal actuator, a time motor to impel both said actuators, a single flow governing member, and connections rendering said member movable back and forth by respectively back and forth movements of each of said actuators.

7. In combination, two timers approachable to an operating position in the same direction of travel, two transmitters actuated in a common direction respectively by similar movements of said timers, differential mechanism for converting the separate movements of said transmitters in a common direction to produce reciprocative movements of an ultimate actuator in respectively opposite directions.

8. In combination, two timers self restorable to zero position in a common direction of travel, a pivoted member to be rocked by said timers, means to convert the travel of one of said timers into rocking of said member in one direction, and means to convert the travel of said other timer into rocking of said member in the opposite direction.

9. In combination, two timers manually settable to variable relative positions and self returnable to a common starting position at equal rates of speed, a device to be timed including a single part shiftable between different positions to effect a flow, mechanism operable by each of said timers and acting upon said single part by movement thereof to reversely affect said device at each successive movement of each of said timers to and away from its starting position.

10. In combination, two timers automatically movable in a common direction of approach to a determinate position and manually movable in the opposite direction to retract from said position, a device mounted to be tilted by said two timers, and connecting mechanism for transmitting the movements of said two timers to said device and including means operated by the approach of one of said timers toward its determinate position thereby to tilt said device in one direction, and means operated by the approach of the other timer toward its determinate position thereby to tilt said device in the opposite direction.

11. In combination, two timers automatically movable in a common direction of approach to a determinate position and manually movable in the opposite direction to retract from said position, a device mounted to be tilted by said two timers, and connecting mechanism for transmitting the movements of said two timers to said device and including means operated by the approach to and retraction from its determinate position of each of said timers thereby to cause tilting movements of said device in respectively opposite directions.

12. In combination, two timers automatically movable in a common direction of approach to a determinate position and manually movable in the opposite direction to retract from said position, a device mounted to be tilted by said two timers, and connecting mechanism for transmitting the movements of said two timers to said device and including means operated by the approach of one of said timers toward its determinate position thereby to tilt said device in one direction, and means operated by the approach of the other timer toward its determinate position thereby to tilt said device in the opposite direction, said means being operated upon by the approach to and retraction from its determinate position of one of said timers thereby to cause tilting movement of said device in respectively opposite directions.

13. In combination, two separately settable timers mounted to be impelled in unison by a common movement to a common position of rest, mechanism acted upon by the approach of each of said timers toward its position of rest and also by the departure of each of said timers from its position of rest but with respectively reverse effect, a current switching device including a single part movable by said mechanism thereby to shift the condition of circuit connections when one of said timers leaves its position of rest and to restore the condition of circuit connections when the other of said timers leaves its position of rest.

14. In timing mechanism, the combination with a flow control mechanism, of two separate and relatively movable setting handles, connections whereby the separate turning of each of said handles in either direction impels a part of the said flow control mechanism to some one of three different positions thereby to affect the flow, and an indicator movable in true correspondence to the changes of position of the said part of said mechanism thereby to serve as an indicator of the condition of flow without reference to the positions of said setting handles.

15. In timing mechanism the combination with a timer and setting handle therefor of a stop to intercept same in one direction of travel, a spring motor to impel said handle toward said stop, and a second stop mounted out of the path of travel of said timer and movable to and from a position to intercept said timer thereby to prevent its return to the first said stop by the running of said spring motor.

16. In timing mechanism a rockable device spring-urged away from a cocked position to a fired position, an actuator movable in one direction to impel said device to its cocked position and then to pass said device, means to fire said member from its cocked position and operated by return movement of said actuator, and means preventing a repetition of contact between said actuator in its return movement and the portion of said device which is engaged by said actuator for impelling said device to its cocked position.

17. Flow governing means embodying in combination a single shiftable part adapted to affect the flow, a reciprocally movable actuator connected to act upon said part with different flow governing effect when said actuator is moved in respectively reverse directions, a second actuator connected to act upon said part with different flow governing effects when said second actuator is moved in respectively reverse directions, and timing mechanism controlling the movement of both said actuators, together with detent means to effect the simultaneous cocking of both said actuators for later release by said timing mechanism.

18. In timing mechanism, in combination, one timer and setting handle therefor self-returnable to zero position, another timer and setting handle therefor self-returnable to zero position, flow governing means including a single movable part to affect the flow, and connections rendering said part positioned to similarly affect the flow by the positioning of said timers both at and away from zero position, said connections also enabling each of said handles to move said flow affecting part back and forth so that said part is positioned to differently affect the flow when one of said timers is at zero position and the other displaced therefrom.

19. In combination, two timing actuators manually settable to selective relative positions and self-returnable to a common starting position at equal rates of speed, a flow governor to be timed consisting of a single part shiftable between different positions to affect the flow, and mechanism for transmitting the movement of said actuators to said part so that the position of said part is shifted to vary the condition of flow when each of said timers is moved to and displaced from its starting position.

20. Flow governing mechanism including a fork-like member biased to either extreme of its normal angle of swing, an actuating pin carried in a path to pass into and out of impelling engagement with said member and to pass same in both directions of travel, timing mechanism, and connections whereby said mechanism impels said pin for shifting said member from one to the other of its biased positions and permitting a slippage of said pin in advance of said mechanism when said pin is acted upon by the tendency of said member to seek the biased position to which it is being moved.

21. In a timing mechanism, the combination with a time movement, of setting means therefor, an ultimate operator, a manual means for moving said operator in one direction, yielding means for reversely moving said operator toward a normal position, two time controlled actuators, means to selectively cock said actuators in a tensioned position alone or together, means operated by said time movement and by said setting means, to fire said actuators from their cocked positions separately and at respectively different times as determined by said setting means, and connections constructed and arranged to permit said operator to be established manually in an advanced or in an intermediate position with respect to its said normal position and to be automatically moved at a predetermined time from its advanced position to its intermediate position or from its intermediate position to its normal position as determined by said setting and cocking means.

RAYMOND D. SMITH.